United States Patent [19]

Clark et al.

[11] 4,132,855
[45] Jan. 2, 1979

[54] SUPPORT INSULATOR FOR GAS-FILLED HIGH-VOLTAGE TRANSMISSION LINE

[75] Inventors: Robert M. Clark, Ligonier; John C. Cronin, Greensburg; David H. Reighter, Roslyn; Vasu H. Tahiliani, Jeannette, all of Pa.

[73] Assignee: Gould Inc., Rolling Meadows, Ill.

[21] Appl. No.: 768,391

[22] Filed: Feb. 14, 1977

[51] Int. Cl.² .............................................. H01B 9/04
[52] U.S. Cl. .................................... 174/28; 174/16 B
[58] Field of Search ............... 174/28, 29, 16 B, 99 B, 174/99 R, 111; 138/112, 113, 114

[56] References Cited

U.S. PATENT DOCUMENTS

| 2,897,542 | 8/1959 | Isenberg | 174/28 |
| 3,629,486 | 12/1971 | Swampillai et al. | 174/16 B |
| 4,018,978 | 4/1977 | Bacvarov | 174/28 |

FOREIGN PATENT DOCUMENTS

| 876354 | 7/1971 | Canada | 174/28 |
| 1017236 | 10/1957 | Fed. Rep. of Germany | 174/28 |
| 956334 | 2/1950 | France | 174/28 |
| 533982 | 2/1941 | United Kingdom | 174/28 |

Primary Examiner—Arthur T. Grimley
Attorney, Agent, or Firm—Ostrolenk, Faber, Gerb & Soffen

[57] ABSTRACT

A support insulator for supporting a high-voltage conductor within the interior of a gas-filled grounded housing has a generally triangular configuration, with the central bus supported within the interior of the triangle and with the apices of the triangle engaging the inner diameter of the grounded enclosure. An inner hub extending from the legs of the triangle assists in the support of the central insulator. The combination of a gas-filled high-voltage transmission line with a plurality of support insulators extending along the length of the line is disclosed.

14 Claims, 11 Drawing Figures

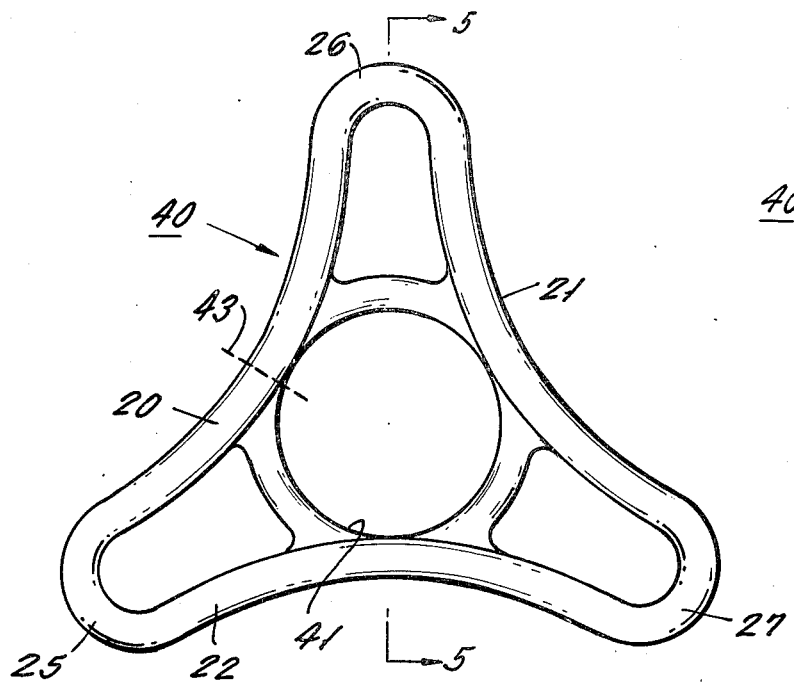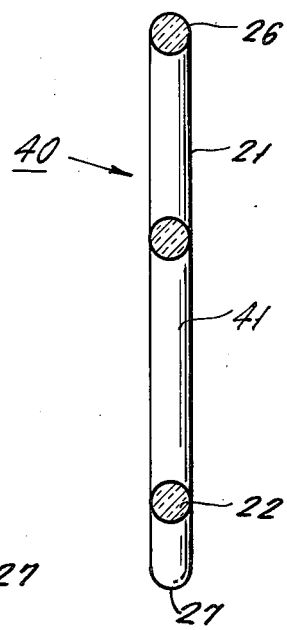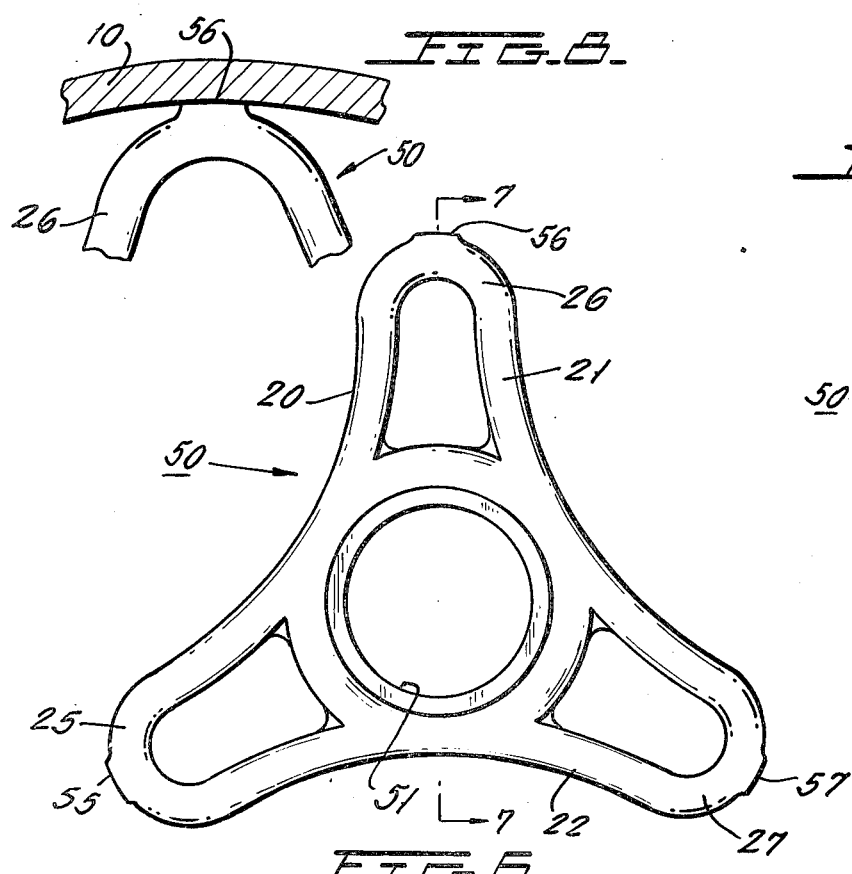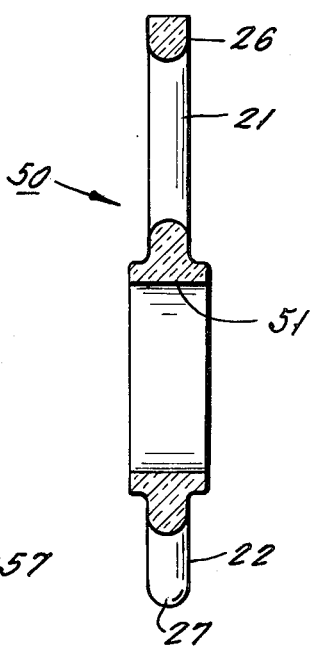

SUPPORT INSULATOR FOR GAS-FILLED HIGH-VOLTAGE TRANSMISSION LINE

RELATED APPLICATIONS

This application is related to the subject matter of copending application Ser. No. 661,122, filed Feb. 25, 1976, now U.S. Pat. No. 4,034,147, date July 5, 1977, entitled CONTAMINATION CONTROL DEVICE, in the name of R. M. Clark et al and is assigned to the assignee of the present invention. The invention is also related to the general subject matter of copending application Ser. No. 734,965, filed Oct. 22, 1976, entitled INSULATION SPACER FOR FLEXIBLE GAS-INSULATED TRANSMISSION LINE, in the name of P. C. Netzel and T. F. Brandt and is assigned to the assignee of the present invention.

BACKGROUND OF THE INVENTION

This invention relates to a novel support insulator for high-voltage high-power gas-insulated transmission lines, and more specifically relates to a novel generally triangular configuration for a support insulator which has improved dielectric properties and can be mechanically formed and assembled into a transmission line assembly.

In the novel insulator of the invention, the central bus is carried within the interior of a generally triangularly shaped insulator, and may be supported within a hub which is integrally formed with the triangular shape. The legs of the triangularly shaped insulator are generally inwardly bent toward the center of the triangle plane and the apices of the triangle engage the inner surface of the grounded support housing.

The triangle apices may be shaped to have a radius generally equal to that of the interior of the support housing. The exact shape of the generally triangularly formed arrangement is constructed to allow easy molding of the triangle form from high dielectric epoxy materials and the shapes further are designed to produce the most favorable dielectric stress distribution through the insulator.

The insulator design has improved electrical properties over designs of the conventional disk or conical insulator in that a long tracking distance is provided, and further the design uses less material than the conventional disk or conical insulator. Moreover, the insulator design permits fully open passages which allows the easy circulation of gas such as $SF_6$ or the like through the housing interior. The design is also well adapted for use in flexible housings having a corrugated outer housing and inner conductor since the three engagement regions formed by the outer apices of the generally triangular shape will nest into the outer housing convolutions. If desired, the insulator can be split to permit the outer ends or insulator to be deformed out of a flat plane, thereby better enabling the insulator to nest within the convolutions of the outer housing.

BRIEF DESCRIPTION OF THE DRAWINGS

FIG. 4 shows a second embodiment of the invention which includes a generally triangularly shaped insulator of the present invention to which a central hub has been added to assist in the support of the central conductor when the insulator is used in the bus of FIGS. 1 and 1a.

FIG. 5 is a cross-sectional view of FIG. 4 when taken across the section lines 5—5 in FIG. 4.

FIG. 6 is a plan view of a further embodiment of the invention wherein the apices of the generally triangular insulator has a radius of curvature which is generally equal to that of the outer housing which is to receive the insulator.

FIG. 7 is a cross-sectional view of FIG. 6 taken across the section lines 7—7 in FIG. 6.

FIG. 8 is an enlarged view of one of the apices of the insulator of FIGS. 6 and 7 showing how it conforms to the interior diameter of a grounded housing.

DETAILED DESCRIPTION OF THE DRAWINGS

Figure 1:
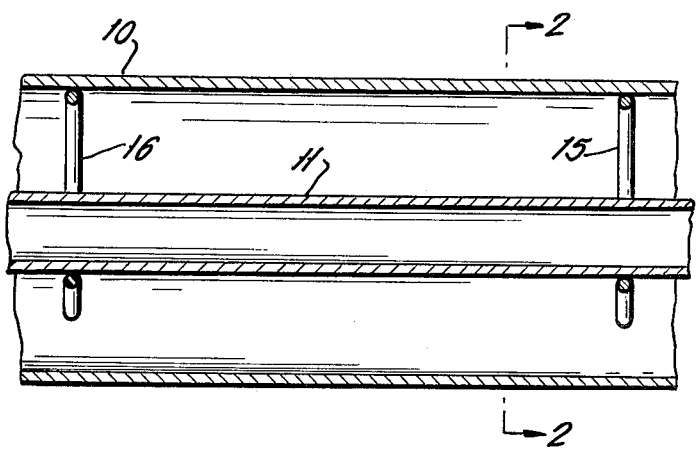
FIG. 1 is a cross-sectional view through the length of a typical high-voltage high-power gas-insulated transmission line which incorporates the insulators of the present invention.
Figure 1A:
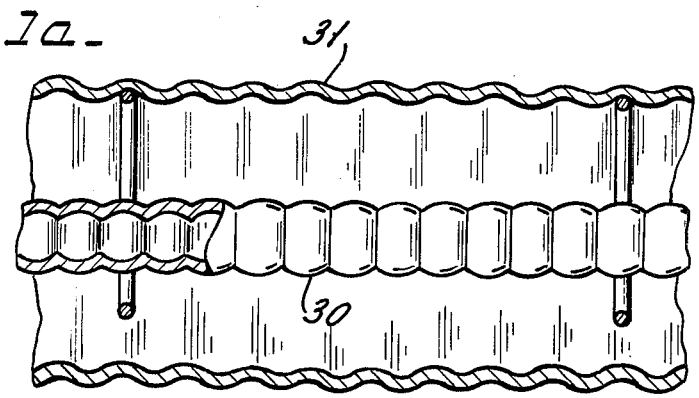
FIG. 1a illustrates the transmission line of FIG. 1 as a flexible line as contrasted to a rigid line.

Referring first to FIGS. 1 and 1a, there is illustrated therein a section of a high-voltage high-power transmission line where, for example, the line can be rated at 345,000 volts. In the line of FIG. 1, the outer grounded conductive housing 10 will have a diameter of about 14 inches and the inner conductor 11 will have a diameter of about 5½ inches. The interior of housing 10 is then filled with a high dielectric gas such as sulfur hexafluoride at a pressure, for example, of about 45 p.s.i.g.

The present invention is directed to a novel support insulator for supporting the central bus 11 within the housing 10 while maintaining good dielectric integrity. In accordance with the invention, support insulators 15 and 16 (FIGS. 1, 1a, 2 and 3) are spaced along the length of the transmission line to support the spaced lengths from the housing 10.

Figure 2:
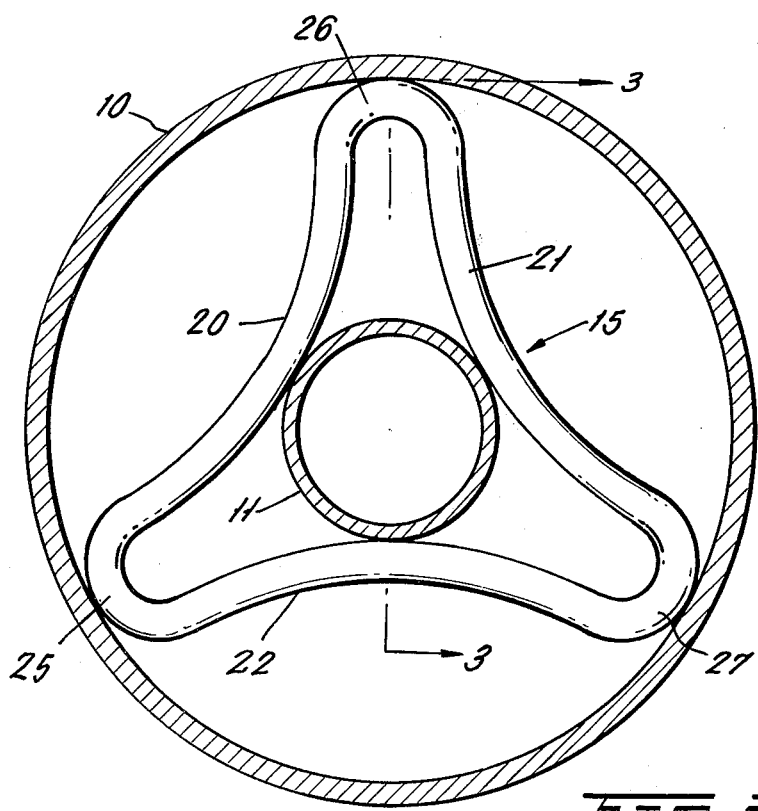
FIG. 2 is a cross-sectional view of FIG. 1 taken across the section lines 2—2 in FIG. 1.
Figure 3:
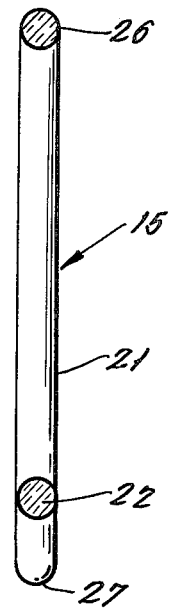
FIG. 3 is a cross-sectional view of FIG. 2 taken across the section lines 3—3 in FIG. 2, to illustrate the general triangularly shaped support insulator of FIGS. 1 and 2.

FIGS. 2 and 3 show insulator 15 as having a novel generally triangular shape consisting of inwardly bent or curved sides 20, 21 and 22 which press inwardly on the outer surface of conductor 11 in order to hold the conductor securely at the center of the insulator. The insulator 15 and other similar insulators extending along the length of the transmission line may be formed of any suitable insulation material and preferably are formed of an epoxy resin which has a smooth outer surface and is free to inclusions and shrink cavities. It will be apparent that the insulator shape shown for the insulator 15 shown in FIGS. 2 and 3 can be easily molded.

The apices 25, 26 and 27 of the generally triangular insulator 15 snugly engage the interior diameter of the outer housing 10, thereby to completely support conductor 11 within outer housing 10.

FIG. 1a shows the insulators 15 and 16 of FIG. 1 for the support of a flexible conductor 30 within a flexible outer housing 31. Flexible conductor 30 is corrugated and, if desired, may contain internal stranded conductors (not shown). Conductor 30 is snugly fitted within the interior of the triangle legs 20, 21 and 22, while the apices 25, 26, and 27 nest within the corrugations of the flexible outer housing 31.

FIGS. 4 and 5 show a second embodiment of the novel triangular insulator of the present invention wherein similar numerals identify similar elements of the support insulator. The insulator 40 of FIGS. 4 and 5 is further provided with a central hub region 41 which is molded integrally with the insulator, and which defines a central support region which fully encloses the outer surface of the central bus 11 of FIG. 1, or the central bus 30 of FIG. 1a, when the insulator is mounted within a transmission line. The use of the central hub 41 improves the dielectric stress characteristics of the insulator and gives it increased mechanical strength as compared to the insulator of FIGS. 2 and 3. If desired, the insulator 40 may have a keyed split region 43 to enable the lateral distortion of the apices 25, 26 and 27 out of a flat plane so that the insulator can distort as needed in order to nest within the convolutions of a flexible outer housing 31 of the type shown in FIG. 1a.

A further embodiment of the invention is illustrated in FIGS. 6, 7 and 8 for an insulator 50 which can be used in place of the insulators of FIGS. 2 to 5 in the assembly of either FIG. 1 or 1a. The insulator of FIGS. 6, 7 and 8 differs from that of FIGS. 4 and 5 in that the central hub 51 is an elongated cylindrical hub and may have a length, for example, of three times the cross-section diameter of the triangle legs 20, 21 and 22. This extending hub 51 reduces the dielectric stress on the insulator at the point where the insulator is joined to the central conductor 11 or 30 of FIG. 1 or 1a.

The insulator of FIGS. 6, 7 and 8 further differs from that of FIGS. 4 and 5 in that the apices 25, 26 and 27 are modified to have enlarged radii sections 55, 56 and 57 which correspond to the radius of curvature of the interior of the grounded housing which they are to engage. Thus, radii 55, 56 and 57 fall on a common diameter corresponding, for example, to the interior diameter of housing 10 as shown in FIG. 8.

Figure 9:
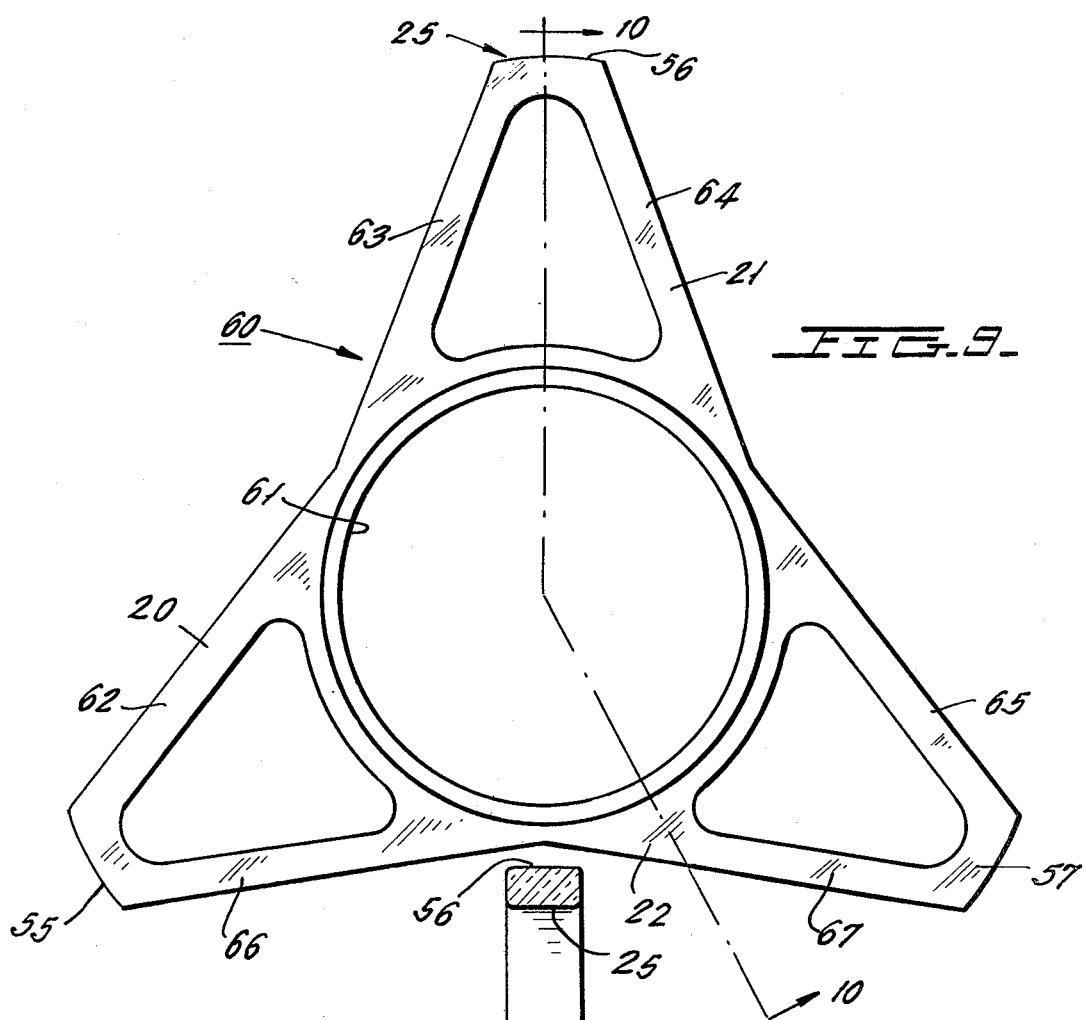
FIG. 9 is a plan view of a preferred shape of a novel epoxy insulator having the generally triangular configuration of the present invention.
Figure 10:
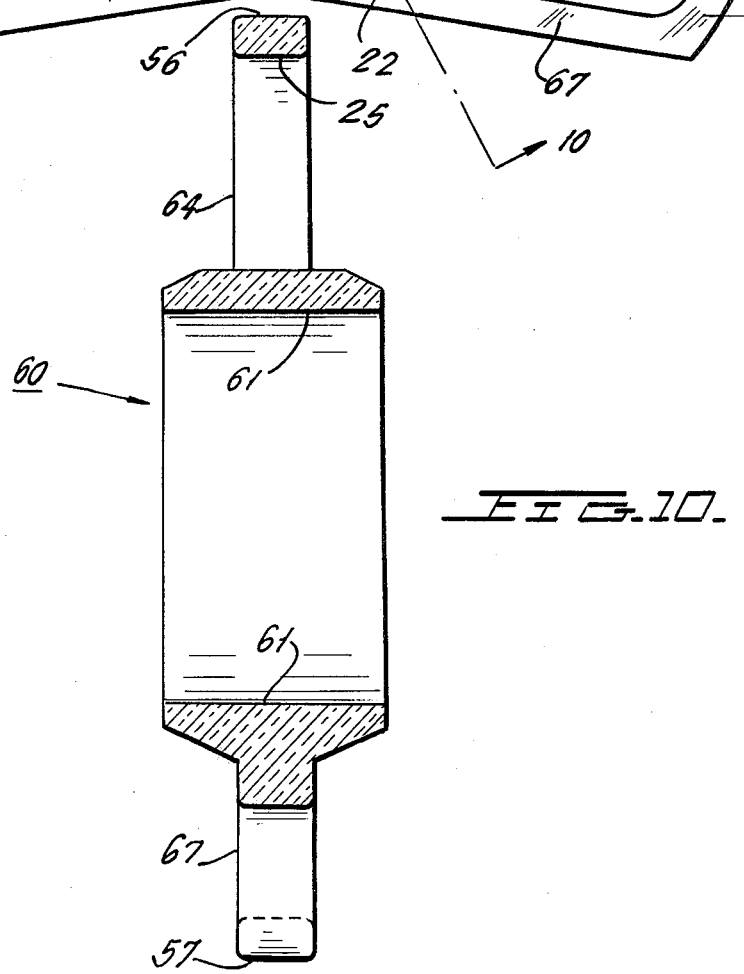
FIG. 10 is a cross-sectional view of the insulator of FIG. 9 taken across the section lines 10—10 in FIG. 9.

FIGS. 9 and 10 illustrate a preferred form of an insulator constructed in accordance with the present invention. The insulator 60 of FIGS. 9 and 10 has a modified configuration for the triangle legs 20, 21 and 22 and for its central hub region 61, and further has a modified cross-sectional shape in order to improve the moldability of the insulator and its dielectric properties.

The triangle legs are now each formed of generally straight sections which meet at an angle in order to define each inwardly bent triangle leg. Thus, triangle leg 20 consists of straight sections 62 and 63 and similarly legs 21 and 22 consist of straight sections 64-65 and 66-67, respectively. Furthermore, the radial sections of the outer apices of the triangle have a greater length than that shown in FIGS. 6, 7 and 8 and, for example, the length of the diameter sections 55, 56 and 57 may be about 1½ inches for a housing diameter of about 14 inches. It will also be noted that the triangle leg sections, such as sections 62 and 63, join one another relatively close to the hub 61 in order to improve the dielectric stress distribution around the hub.

As is best shown in FIG. 10, the hub 61 is about three times the length of the thickness of the triangle legs. Furthermore, it will be seen that the triangle leg is not circular in cross-section as in the preceding figures, but generally is an elongated rectangle as shown by the rectangular cross-secton of apex 25 in FIG. 10. The rectangle cross-section for the insulator of FIG. 10 is about ½ inch in radial thickness by about 1 inch in length. Note that all edges for the insulator are given a radius which could, for example, be a ⅛ inch radius as appropriate.

It will be noted again that the insulator of FIGS. 9 and 10 can be assembled within the bus enclosure of FIG. 1 or 1a. When assembled within the bus, the insulators have an improved dielectric distribution and provide good high strength mechanical support for the bus within its outer enclosure. Moreover, the entire support insulator of the invention is easily moldable, has a relatively low mass and provides extremely wide channels for permitting gas flow through the insulators.

Although a preferred embodiment of this invention has been described, many variations and modifications will now be apparent to those skilled in the art, and it is therefore preferred that the instant invention be limited not by the specific disclosure herein but only by the appended claims.

The embodiments of the invention in which an exclusive privilege or property is claimed are defined as follows:

1. An insulator support for a gas-insulated transmission line; said gas-insulated transmission line comprising an elongated central conductor suspended within and along the axis of an elongated gas-filled outer housing; said insulator support comprising a generally triangularly shaped molded insulation member having three legs in a common plane and joined together at three respective apices; each of said three legs being generally inwardly bowed toward the center of said triangular shape; said inwardly bowed legs being adapted to engage and support said central conductor of a gas-insulated transmission line; each of said three apices being adapted to engage the inner diameter of said outer housing of said gas-insulated transmission line; each of said three legs being identical to one another; each of said three legs having a constant cross-sectional configuration for substantially their full lengths.

2. The insulator of claim 2 wherein said three legs are joined together by a central circular hub which is integral with said legs.

3. The insulator of claim 2 wherein said circular hub extends axially beyond the opposite major surfaces of said insulator.

4. The insulator of claim 1 wherein said apices have an outer radius which match the radius of the interior of said outer housing.

5. The insulator of claim 4 wherein said three legs are joined together by a central circular hub which is integral with said legs.

6. The insulator of claim 1 wherein each of said legs has a circular cross-section.

7. The insulator of claim 1 wherein each of said legs has a generally rectangular cross-section.

8. The insulator of claim 5 wherein each of said legs has a circular cross-section.

9. The insulator of claim 5 wherein each of said legs has a generally rectangular cross-section.

10. The insulator of claim 9 wherein each of said legs consists of first and second generally straight sections.

11. A gas-insulated transmission line comprising, in combination: a central conductor; an outer grounded housing; and a plurality of spaced support insulators for supporting said central conductor within said outer grounded housing; each of said support insulators comprising a generally triangularly shaped molded insulation member having three legs in a common plane and joined together at three respective apices; each of said three legs being generally inwardly bowed toward the center of said triangular shape; said inwardly bowed legs being adapted to engage and support said central conductor of a gas-insulated transmission line; each of said three apices being adapted to engage the inner diameter of said housing of said gas-insulated transmission line; each of said three legs being identical to one another; each of said three legs having a constant cross-sectional configuration for substantially their full lengths.

12. The transmission line of claim 11 wherein, for each of said insulators, said three legs are joined together by a central circular hub which is integral with said legs; and wherein said circular hub extends axially beyond the opposite major surfaces of each of said insulators; and wherein said apices have an outer radius which match the radius of the interior of said outer housing.

13. The transmission line of claim 12 wherein each of said legs has a generally rectangular cross-section.

14. The transmission line of claim 13 wherein each of said legs consists of first and second generally straight sections.

* * * * *